Dec. 21, 1954  G. I. M. PORTER  2,697,319
ADJUSTABLE DRAFT MEANS FOR MULTIPLE DISK TYPE MOWERS
Filed March 7, 1952  3 Sheets-Sheet 3
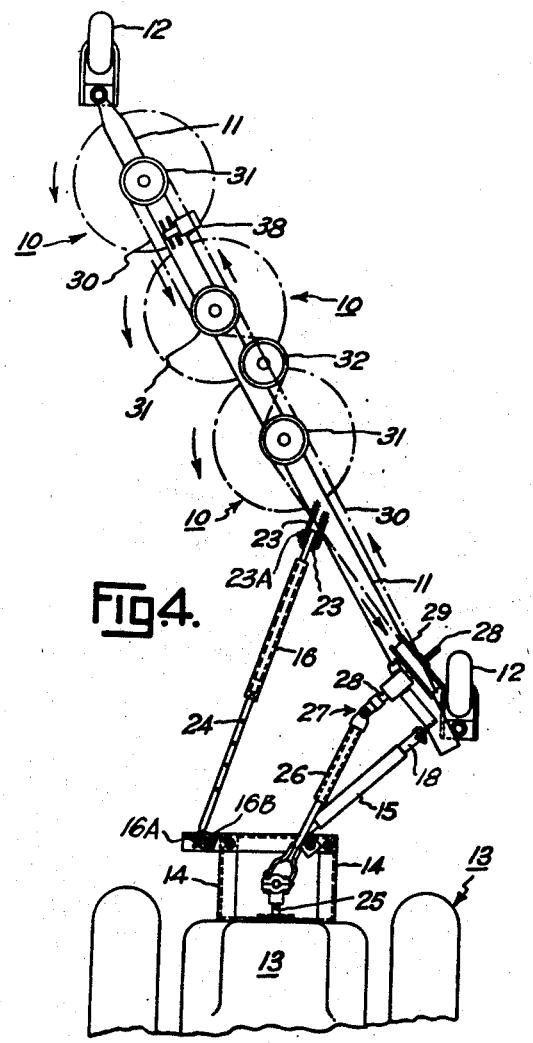
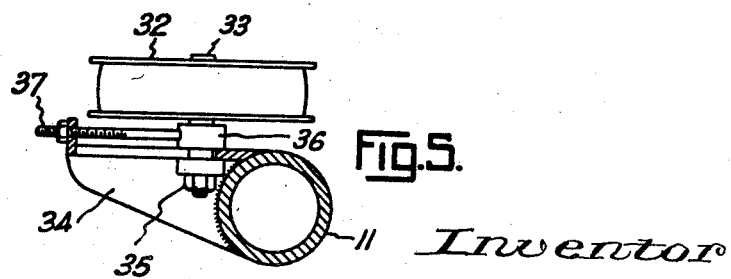
Inventor
G. I. M. Porter

United States Patent Office 2,697,319
Patented Dec. 21, 1954

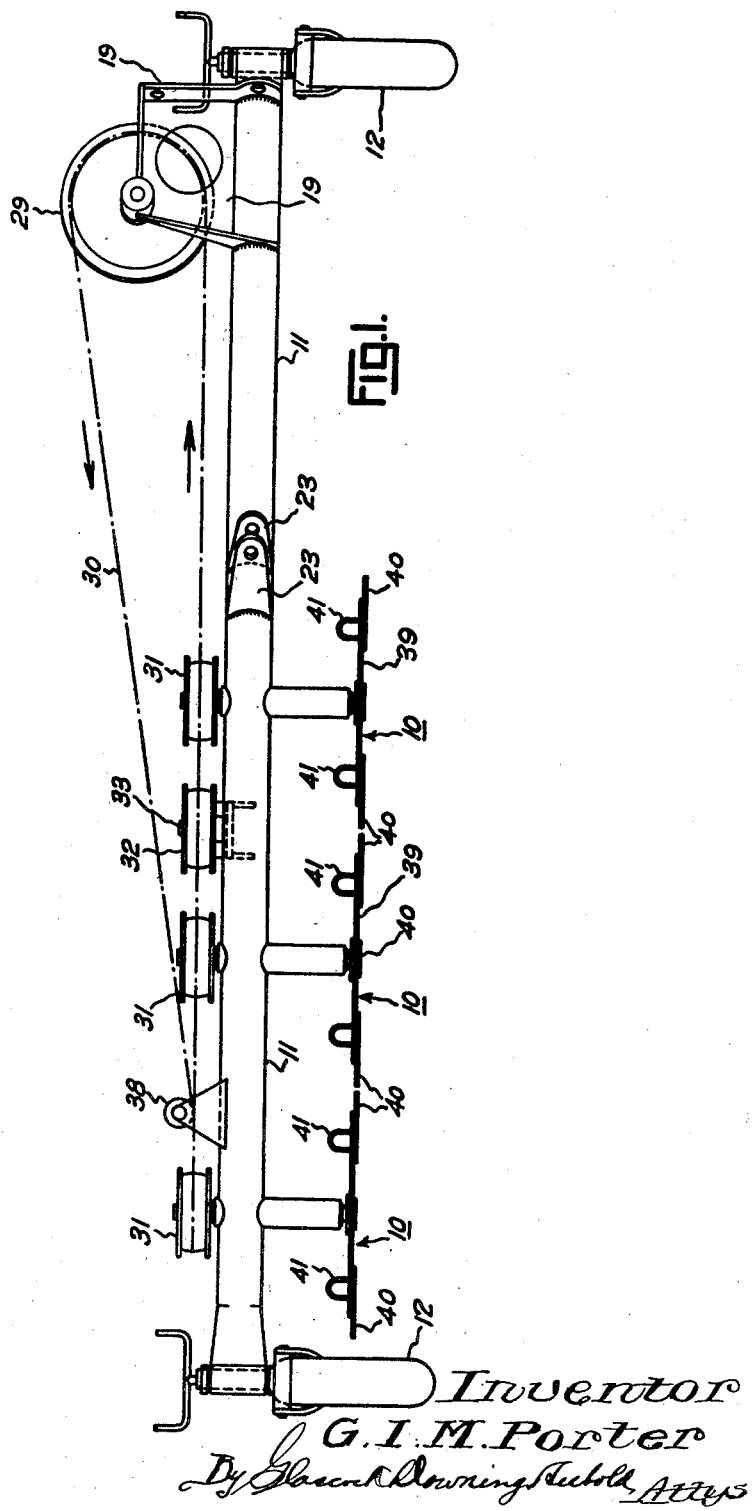

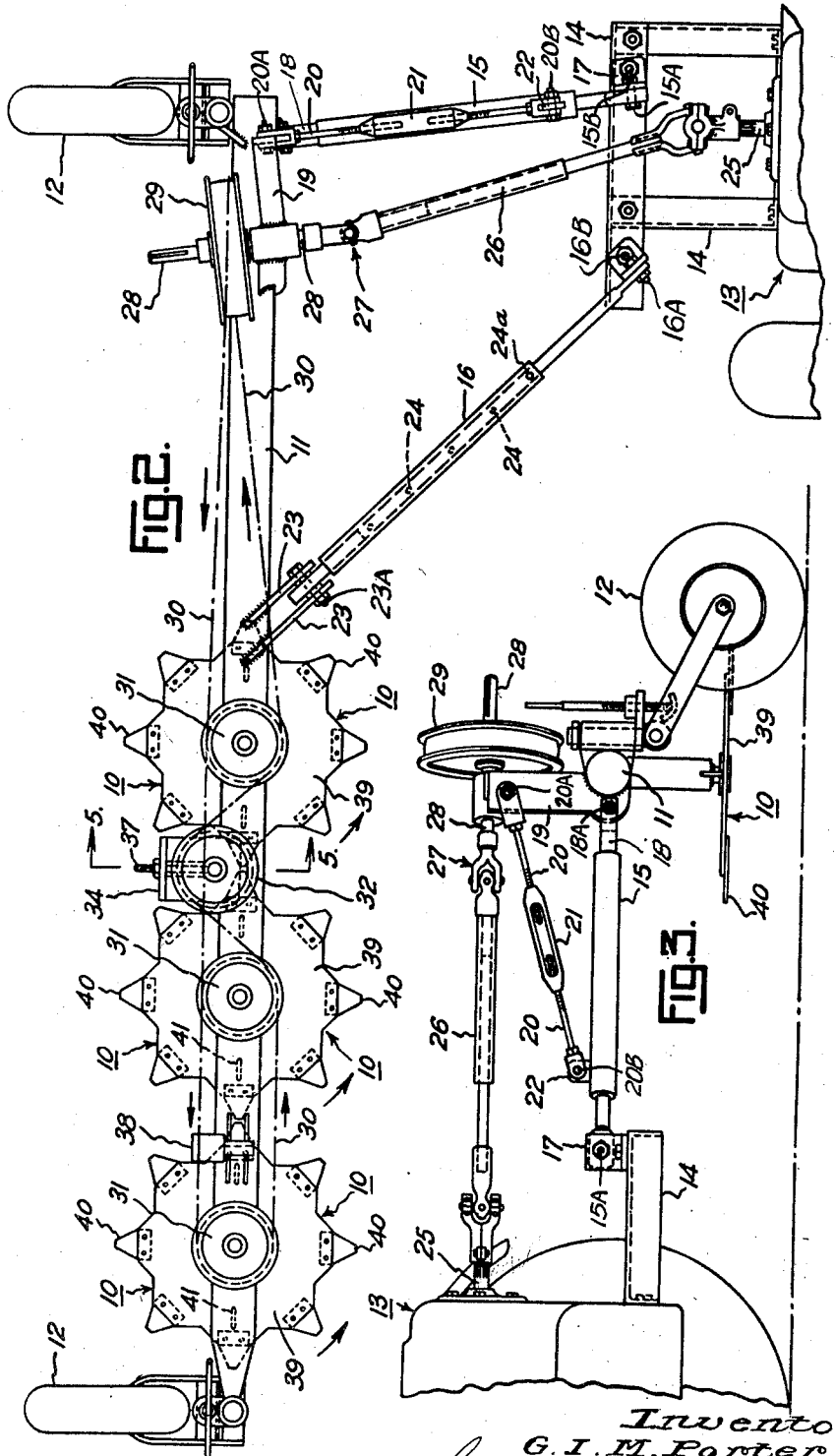

2,697,319

ADJUSTABLE DRAFT MEANS FOR MULTIPLE DISK TYPE MOWERS

George Ian Maxwell Porter, Chatswood, near Sydney, New South Wales, Australia

Application March 7, 1952, Serial No. 275,255

Claims priority, application Australia March 12, 1951

3 Claims. (Cl. 56—25.4)

This invention relates to mowing machines of the type wherein cutters are arranged in a gang and wherein each cutter lies in a horizontal plane and is rotatable at relatively high speed about a vertical axis: that is to say it relates to machines wherein mowing is effected not by shearing the vegetation between the edges of co-acting cutting components but by the impact of cutters rotated at relatively high speed to develop considerable centrifugal force.

It is known that some machines in accordance with the foregoing general description have been devised from time to time but these have been somewhat complicated in construction and have not always proved satisfactory in use.

The present invention has been devised with the object of providing a relatively simple mowing machine capable of being propelled and operated by a farm tractor of standard construction, and designed to cut a uniform swath alongside the path traversed by said tractor.

A further object of the invention is to provide a mowing machine of the foregoing general description whereby the cutters will tend to throw the mown vegetation toward one side of the swath, to facilitate its subsequent collection if desired, and to prevent its being thrown into the standing vegetation.

The improved machine is intended not only for keeping grass under control in comparatively large areas but for the mowing of crops, such as lucerne and other cattle food, and for similar purposes. In fact experiments have demonstrated that the machine is capable of mowing with ease many types of vegetation with quite thick strong stems.

One of the major virtues of the invention is that the gang of cutters is capable of being swung into a trailing position behind the tractor so that the whole can proceed through gateways or along relatively narrow paths. This facility also allows of the gang being positioned at an angle to the longitudinal axis of the tractor so that the width of swath to be cut can be varied within comparatively wide limits according to the nature of the work to be performed.

In order however that the invention may be clearly understood and readily carried into practical effect reference is now made to the accompanying drawings wherein:

Figure 1 shows in elevation, the gang of cutters and the supporting frame of the improved machine in its preferred form;

Figure 2 is a plan of the improved machine operatively connected to a farm tractor of conventional design;

Figure 3 is an end elevation of the improved machine as portrayed by Figure 2;

Figure 4 illustrates in plan on a somewhat smaller scale, and somewhat schematically the improved machine illustrated by the foregoing figures but arranged substantially in tandem with the tractor; and Figure 5 is an enlarged sectional elevation taken on the plane 5—5 in Figure 2, to indicate the provision made for adjusting the intervening idle pulley hereinafter referred to.

According to the construction illustrated the improved machine comprises three rotary cutters 10 which are supported by a tubular boom 11 (not necessarily cylindrical) or an equivalent contrivance such as a triangular frame. This boom 11 is mounted on adjustable wheels 12 and in its normal position is arranged to be drawn along at one side and slightly to the rear of the farm tractor 13, the rear portion only of which appears in the drawings.

The boom 11 is connected to a frame 14 affixed to the rear of the tractor, by means of a main draw-bar 15 and a telescopic subsidiary draw-bar 16 (see Figure 2). The fore end of the main draw-bar 15 is connected to the frame 14 through the medium of a bracket 17 in such manner as to allow of movement in a horizontal as well as vertical plane. This will be understood on reference to Figure 3 wherein 15A is the horizontal pivot means and 15B is the vertical pivot means. The after end 18 of draw-bar 15 is bifurcated and connected as at 18A to a vertical bracket 19 welded to the boom 11. A tie-rod 20 with turn-buckle 21 is connected between this bracket 19 and a lug 22 on the main draw-bar 15, the connections being 20A and 20B, respectively. This allows of the boom 11 being rotated slightly to tilt the cutters 10 when close cropping is to be performed.

The subsidiary draw-bar 16 also has its fore end connected for horizontal and vertical movement in relation to the frame 14, the horizontal pivot means being shown at 16A and the vertical pivot means at 16B; and its after end is connected between a pair of cheeks 23 as at 23A for movement about a horizontal axis and limited movement about a vertical axis, the cheeks being welded to the boom 11. This mounting of the subsidiary draw-bar 16 and the main draw-bar 15 enables the horizontal position of the respective draw-bars relative to the tractor to be adjusted to determine the position of the boom with respect to the tractor. A series of holes 24 is formed along the draw-bar 16 to allow its members being locked together by a suitable pin such as 24a, to determine the angular relationship between the boom 11 and the tractor 13.

Power to drive the several cutters 10 is derived from a conventional "power take-off" 25 at the rear of the tractor 13. This "power take-off" has connected to it, by means of a universal coupling, a telescopic driving shaft 26 the after end of which, through the medium of a universal coupling 27, is arranged to drive a spindle 28. In this particular exemplification of the invention the spindle 28 is set at a slight angle, but it will be realized that such an arrangement is not essential in all cases. Fast on the spindle 28 there is a flanged pulley 29 which, through the agency of a belt indicated by the line 30, is arranged to drive the three pulleys 31 all (in the example illustrated) in an anti-clockwise direction.

The beforementioned intervening idle pulley 32 is located between the first and second pulleys 31 counting from the rear of the tractor. On reference to Figure 5 it will be seen that this idle pulley 32 is mounted on a vertical axle 33 which is slidable in a slotted bracket 34. The bracket 34 is welded to the boom 11. Normally the axle 33 is held stationary by means of a nut 35 but when it is desirable or necessary to alter the tension in the belt (indicated by 30) this nut 35 can be slackened and the adjustment effected by medium of a collar 36 and the screwed arm 37.

Adjacent to the third pulley 31, that is to say the one farthest from the tractor, there is a small guide-roller 38 under which the upper or slack length of the belt 30 runs. The belt is then quartered and runs around said third pulley 31, the path of its driving side being as indicated clearly in Figure 4.

Reverting now to the cutters 10 it will be seen on reference to Figure 2 that each of these consists of a flat polygonal plate 39 with somewhat triangular knives 40 removably affixed thereto, each complete cutter, according to the particular construction illustrated, presenting a somewhat star shaped configuration. The plates 39 could however be square with their corners removed to receive the knives 40.

The inverted U pieces 41 affixed to the upper surface of the plates 39, as indicated in Figure 1, serve to fling mown vegetation to one side as the cutters rotate.

In the machine illustrated the cutters are all driven in an anti-clockwise direction and this has the effect of flinging the mown vegetation into a path between the cutters and the tractor.

Preferably a hood or cover would be provided to enclose the belt and the several driving pulleys of the machine.

In some cases the spindle 28 may be extended rearwardly of the boom 11 and there operatively connected to means for driving a pick-up and baling appliance or a side delivery rake (not shown).

The wheels 12 on which the boom 11 is mounted are part of an adjustable castor which has been made the subject of a separate application for Letters Patent. It will be appreciated that the wheels 12 could be arranged in a different manner, but the adjustable castor illustrated affords a particularly convenient mode of raising and lowering the boom 11 with its cutters 10, in relation to the ground.

The tie-rod 20 with its turn-buckle 21 affords ready means whereby the boom 11 can be turned slightly about its longitudinal axis to tilt the cutters 10 and thus allow of their cutting parallel to the ground.

In use, the improved machine would normally be towed along with the boom 11 extending at right angles to the path of the tractor as indicated in Figure 2, but should it be desired to cut a narrower swath or to proceed through a gate-way or along a relatively narrow path the pin 24a for locking the draw-bar 16 may be removed or relaxed until the machine assumes a position similar to that indicated by Figure 4. On the components of draw-bar 16 again being locked by the pin 24a the tractor can proceed on its way with the mowing machine then substantially in tandem.

I claim:

1. A mowing machine combined with a tractor comprising a boom, ground wheels supporting the boom for movement along the ground, a main draw-bar pivotally connected at one end thereof to the tractor for movement about a horizontal axis and a vertical axis, means pivotally connecting the other end of the draw-bar to the boom for movement about a horizontal axis only, a longitudinally adjustable subsidiary draw-bar pivotally connected at one end to the tractor for movement about a horizontal axis and a vertical axis and at the other end to the boom for movement about a horizontal axis and limited movement about a vertical axis so that the horizontal position of the main draw-bar and the horizontal position of the subsidiary draw-bar relative to the tractor determines the position of the boom with respect to the tractor, a plurality of rotary cutters arranged in a gang below the boom with the cutters lying in a horizontal plane and rotatable about vertical axes, and means operatively connected to the tractor power plant and the cutters to rotate the cutters.

2. A mowing machine as defined in claim 1 further characterized in that means is operatively connected to the boom to partly rotate the boom to tilt the cutters to cut at an angle to the horizontal.

3. A mowing machine as defined in claim 2 further characterized in that the means to partly rotate the boom includes a tie rod pivotally connected at one end to the main draw-bar, a second tie rod pivotally connected at one end to the boom and a turnbuckle connected to the free end of each tie rod.

References Cited in the file of this patent

UNITED STATES PATENTS

| Number | Name | Date |
|---|---|---|
| 1,397,365 | Cook | Nov. 15, 1921 |
| 1,656,105 | Durkee | Jan. 10, 1928 |
| 2,038,284 | Hanson | Apr. 21, 1936 |
| 2,314,215 | Hilblom | Mar. 16, 1943 |
| 2,489,204 | Sprick et al. | Nov. 22, 1949 |
| 2,531,557 | Dayton | Nov. 28, 1950 |
| 2,566,144 | Ross | Aug. 28, 1951 |